United States Patent
Kita et al.

[11] Patent Number: 6,102,565
[45] Date of Patent: Aug. 15, 2000

[54] CERAMIC SHEATH TYPE THERMOCOUPLE

[75] Inventors: Hideki Kita; Hideo Kawamura; Kazuo Miyajima, all of Kanagawa-ken, Japan

[73] Assignee: Isuzu Ceramics Research Institute Co., Ltd., Kanagawa-ken, Japan

[21] Appl. No.: 08/890,427

[22] Filed: Jul. 9, 1997

[30] Foreign Application Priority Data

Jul. 12, 1996 [JP] Japan .................................. 8-201014
Oct. 25, 1996 [JP] Japan .................................. 8-299820

[51] Int. Cl.$^7$ .............................. G01K 1/08; G01K 7/04; H01L 35/02
[52] U.S. Cl. ........................ 374/179; 136/233; 374/140
[58] Field of Search ................................... 374/179, 163, 374/183, 140, 139, 208; 136/233, 230, 227, 224, 234, 232

[56] References Cited

U.S. PATENT DOCUMENTS

| | | | |
|---|---|---|---|
| 5,005,986 | 4/1991 | Najjar et al. | 374/125 |
| 5,603,571 | 2/1997 | Eckert | 374/140 |
| 5,696,348 | 12/1997 | Kawamura | 136/230 |
| 5,709,474 | 1/1998 | Richardson | 136/234 |
| 5,772,324 | 6/1998 | Falk | 136/230 |
| 5,804,466 | 9/1998 | Arao et al. | 438/95 |
| 5,868,497 | 2/1999 | Jung | 374/179 |

FOREIGN PATENT DOCUMENTS 1326154  8/1963  France .
61246636  6/1987  Japan .
6-160200  6/1994  Japan .

*Primary Examiner*—Diego Gutierrez
*Assistant Examiner*—Maria Fernandez
*Attorney, Agent, or Firm*—Browdy and Neimark

[57] ABSTRACT

This ceramic sheath type thermocouple has a long service life, an improved temperature measuring responsibility and an improved temperature measuring precision, and enables repetitive use. The ceramic sheath type thermocouple has its protective tube 1 formed of a heat resisting ceramics selected from silicon nitride, sialon and silicon carbide. In the protective tube 1 are installed a pair of W—Re wires that are connected to form a joint portion constituting a temperature measuring point 5. A filler made of $Si_3N_4$ reaction-sintered ceramics is loaded into the front end portion of the protective tube to enclose the W—Re wires. Another filler made of SiC whisker with a heat conductivity smaller than that of the filler of the front end portion is loaded into the rear portion of the protective tube. An inert gas is sealed in the protective tube. Alternatively, the temperature measuring portion may be formed by exposing from the front end portion of the protective tube the joint portion where the ends of the W—Re wires are connected. The temperature measuring portion is coated with a cover film that is made of silicon carbide, silicon nitride or a composite of these, all having excellent heat resisting and corrosion resisting properties.

5 Claims, 6 Drawing Sheets

CERAMIC SHEATH TYPE THERMOCOUPLE

BACKGROUND OF THE INVENTION

1. Field of the Invention

The present invention relates to a ceramic sheath type thermocouple having a protective tube made of ceramics that can measure high temperatures.

2. Description of the Prior Art

Sheath type thermocouples have been used as protective tubes for metal glow plugs and stainless steel (SUS) sheath type parts used at elevated temperatures and some of them are fabricated from stainless steel. The thermocouples employ a variety of kinds of measuring materials to measure a range of temperature between 300° C. and 1400° C. For example, the stainless steel sheath type thermocouples used in atmosphere at temperatures higher than 1000° C. are made from special heat resisting alloys such as inconel.

Thermocouples that measure the temperature of molten cast iron of about 1500° C. are made by using a wire of Pt—Rh that has a relatively high melting point and is stable in atmosphere and fixing the Pt—Rh wire to a tube of alumina silica fiber. Such thermocouples, however, become unable to take accurate measurements of temperature after about two measurements of the temperature of molten cast iron and thus are normally discarded. The thermocouples are currently not able to be used repetitively a number of times, which necessarily makes them very expensive.

Further, the wires of the thermocouples are often vulnerable to oxidizing or reducing atmospheres and thus generally installed inside a protective tube for use.

Another known ceramic thermocouple for high temperature measurement has a construction in which a W—Re wire is installed in a silicon nitride protective tube which is formed with venting holes at the side and filled with reaction sintered silicon nitride scattered with TiN.

When a conventional protective tube is made of SUS, however, its heat resisting temperature limit during use is as low as 900° C. Further, it is not safe to use the SUS protective tube in a sulfur gas because the metal of the protective tube is eroded by sulfur. When the protective tube is made from a special heat resisting alloy such as inconel, its heat resisting temperature is higher than that of the SUS protective tube but its cost is about two times higher.

The above ceramic sheath type thermocouple has another drawback that when it is used in a high-temperature atmosphere, the W—Re wire will be degraded by oxygen entry into the tube through the venting holes formed in the protective tube. The thermal expansion coefficient of the W—Re wire is $4.8 \times 10^{-6}/°$ C., greater than that of a W wire, and stresses caused by the difference in thermal expansion coefficient between the W—Re wire and the material surrounding the wire can deteriorate the wire as the thermocouple is repetitively used.

In the structure of the above ceramic sheath type thermocouple, in which the W—Re wire is contained in the protective tube whose hollow space is filled with reaction-sintered $Si_3N_4$ mixed with TiN, however, the responsibility of temperature measurement is not good and needs to be improved.

The thermocouple has the following thermo-electromotive force according to the kind. The thermoelectromotive force of a PR(Pt—Rh) thermocouple is 1.241 mV at 500° C. and 4.833 mV at 1000° C. The thermoelectromotive force of a CA (chromel-alumel) thermocouple is 20.64 mV at 500° C. and 41.269 mV at 1000° C. And the W—Re thermocouple has the thermo-electromotive force of 8.655 mV at 500° C. and 18.257 mV at 1000° C.

The service temperatures of these thermocouples and atmospheres in which they can be used are as shown in FIG. 12. The Pt—Rh thermocouple cannot be used in an inert gas but can only be used in air up to 1500° C. The CA thermocouple can be used in both air and inert gas atmospheres up to 800° C. Further, the W—Re thermocouple is available for use in both air and inert gas atmospheres, up to 400° C. for air and 2300° C. for inert gas.

The PR thermocouple using a Pt—Rh wire has a small thermoelectromotive force, about $\frac{1}{15}$ that of the CA thermocouple and about $\frac{1}{7}$ that of the W—Re thermocouple, and thus its measuring precision and responsibility are worse than those of the latter thermocouples. For this reason, to measure the temperature of the molten metal in the blast furnace, a worker is required to stay at a measuring location near the smelting furnace for about eight seconds until the temperature stabilizes. Another drawback is that because cast iron adheres to the Pt—Rh wire of the thermocouple when measuring the temperature of the molten metal, a complex process of removing the sticking iron is required. Further, the existing thermocouples can be used for only two or so measurements and the replacement of the thermocouples takes time. Furthermore, the W—Re wire of the thermocouples is easily oxidized in air and thus cannot be used for measuring the temperature of molten cast iron.

Japanese Patent Laid-Open No. 160200/1994 discloses a sheath type thermocouple with hermetically sealing terminals. This thermocouple can prevent measuring errors even when a temperature gradient is produced at the terminal portion by transient temperature changes. A thermocouple wire made of different metal wires-alumel and chromel wires—is installed in a stainless steel sheath with an inorganic insulating material filled in the sheath to isolate the sheath and the thermocouple wire and with the base side of the sheath hermetically sealed with the hermetically sealing terminal portion. A ceramic end plate of the hermetically sealing terminal portion is attached with two kovar piercing pipes, through which insulating sleeves are inserted. The thermocouple wires pass through the insulating sleeves and are drawn out without directly contacting the piercing pipes. Where a stainless steel sheath is used as a protective tube, if gases such as sulfur are present in the atmosphere, the stainless steel sheath which is directly exposed to an external atmosphere will be corroded, degrading the durability of the thermocouple.

SUMMARY OF THE INVENTION

The object of this invention is to solve the above problems and to provide a ceramic sheath type thermocouple whose temperature measuring responsiveness is improved by increasing the heat conductivity of a first filler loaded into the front end portion, as the temperature measuring portion, of the ceramic protective tube, by reducing the heat conductivity of a second filler loaded into the rear portion of the protective tube other than the front end portion, and by making small the thickness of the front end portion of the protective tube, the fillers enclosing the W—Re wires installed in the protective tube.

The ceramic sheath type thermocouple of this invention comprises: a protective tube made of a ceramics selected from silicon nitride, SiAlON and silicon carbide and having an end face of a front end portion thereof closed, the front end portion constituting a temperature measuring portion; a pair of W—Re wires of different compositions installed inside the protective tube and connected together in a region of the front end portion of the protective tube; a first filler filled into the front end portion of the protective tube to enclose the W—Re wires and made mainly of a reaction-sintered $Si_3N_4$ ceramics; and a second filler filled into the protective tube other than the front end portion and made of a material having a heat conductivity smaller than that of the first filler.

The first filler is a composite ceramics containing Ti. The second filler is a ceramic fiber or a reaction-sintered ceramics.

An inert gas such as $N_2$ and Ar is introduced into the protective tube. To seal the inert gas in the protective tube, the open end of the protective tube is hermetically closed by a sealing member.

The first filler contains particles having a heat conductivity of 50 W/m·K or higher. These particles are AlN, SiC or $Si_3N_4$.

The front end portion of the protective tube is smaller in outer diameter than other parts of the protective tube and is formed thin.

Because the front end portion of the protective tube is filled with a reaction-sintered material that tends to expand during sintering, as described above, the reaction-sintered material makes hermetic contact with the protective tube to increase a heat passing area, which in turn improves the heat conductivity of a region near the heat measuring point with respect to the surrounding to be measured and thereby enhances the responsibility of the thermocouple.

Particularly because the second filler loaded into the rear portion of the protective tube has a heat conductivity smaller than that of the first filler of the front end portion, the heat of the front end portion is not easily transferred to the rear portion, reducing the amount of heat released to the rear portion and concentrating the heat in the front end portion. This causes the temperature of the front end portion (temperature measuring point) to rise quickly in a short time to the temperature of the object being measured, allowing an immediate and precise measurement of the temperature of the object and improving the responsibility of the temperature measurement.

Further, this ceramic sheath type thermocouple has the front end portion of the protective tube formed thin to reduce its heat capacity so that the temperature of the front end portion can quickly reach the temperature of the object being measured. An inert gas sealed in the protective tube prevents deterioration of the W—Re wires. Further, the heat conductivity can be increased by adding AlN and $Si_3N_4$ dispersively to the composite ceramics filled in the protective tube.

As explained above, the heat conductivity of the filler loaded in the front end portion of the protective tube is set higher than that of the filler loaded in the rear portion of the protective tube, and the heat conductivity of the rear portion is made as small as possible. This arrangement causes the temperature of the front end portion to rise quickly to the temperature of the object being measured and at the same time makes it difficult for the heat of the front end portion to escape through the protective tube to the rear portion, thereby improving the responsibility of temperature measurement. The responsibility can be further improved by reducing the thickness of the front end portion of the protective tube.

Another object of this invention is to provide a ceramic sheath type thermocouple, in which the W—Re wires are exposed at their front ends from the protective tube, the exposed portion of the W—Re wires is deposited with a fine cover film of silicon carbide and silicon nitride by the chemical vapor deposition (CVD), and the molten metal pouring portion of the protective tube is removably attached with a socket of silicon carbide fiber so that the protective tube does not directly contact a molten metal, thereby improving the heat resistance, corrosion resistance and temperature measurement responsibility and realizing repetitive use for high-temperature measurement and longer service life.

This invention relates to the ceramic sheath type thermocouple which comprises: a protective tube made of a ceramics selected from silicon nitride, SiAlON and silicon carbide; a pair of W—Re wires of different compositions installed inside the protective tube; a joint portion where the ends of the W—Re wires are joined, the joint portion constituting a temperature measuring portion exposed from the protective tube; a cover film formed over the joint portion of the W—Re wires exposed from the protective tube, the cover film being made of silicon carbide, silicon nitride or a composite of these; and a heat resisting filler filled into the protective tube and having a small dimensional change during sintering.

In this ceramic sheath type thermocouple because the heat resisting filler is a reaction-sintered ceramics containing Ti, no clearances are formed at the boundary between the protective tube and the heat resisting filler and there is no play at the boundary, ensuring an $N_2$ gas to be sealed in good condition, preventing the W—Re wires from being oxidized, improving the durability of the thermocouple. The reaction-sintered ceramics has a heat insulating function and thus can limit the temperature measuring region to the wire joint portion at the front end reliably reducing the heat capacity of the temperature measuring region. This permits the temperature measurement of an object such as a molten metal to be performed by raising the temperature of only the small temperature measuring region, which in turn allows rapid and precise measurement of temperature.

Because of the above configuration, this ceramic sheath type thermocouple is suited for measuring high temperatures. Further the W—Re wires have a relatively large thermoelectromotive force and the front end portion as the temperature measuring portion is exposed so that its heat capacity can be minimized, improving its responsiveness to temperature. Further, because the melting point of the W—Re wires is 3000° C., they are not melted in the molten iron.

A fine cover film of silicon nitride or silicon carbide with a thermal expansion coefficient close to that of the W—Re wires is formed over the surface of the W—Re wires by the CVD to prevent oxidation of the W—Re wires in the temperature measuring portion. Because the reaction-sintered, heat resisting filler makes hermetic contact with the protective tube, no clearance is formed at the boundary between them, increasing the heat passage area. Because the temperature measuring portion is covered with a cover film and its heat capacity minimized, its heat conduction with respect to the surrounding is enhanced and thus its responsiveness improved.

The end of the protective tube on the temperature measuring portion side is fitted with a socket of silicon carbide fiber. The socket has excellent oxidation resistance and thus fitting the socket on the thermocouple prevents damages to the molten metal contact region of the protective tube due to thermal impacts, prolonging the life of the protective tube.

The cover film is formed by the CVD over the entire surface of the protective tube. The cover film of silicon nitride or silicon carbide formed by the CVD has large crystal grains and contains almost no impurities, which in turn minimizes phonon dispersion and increases the heat conductivity. Therefore, the thermocouple with the cover film has excellent heat resistance and impact resistance. Because the molten iron does not easily wet the cover film, in other words, a Fe metal does not easily adhere to the surface of the thermocouple, the thermocouple is easy to handle and has an improved temperature measuring accuracy.

If we let Tc be a thermal impact resistance temperature, $\lambda$ a heat conductivity, d a thickness of the cover film, h a heat transfer coefficient, $\nu$ a Poisson's ratio, $\sigma_t$ a strength, E a Young's modulus and $\alpha$ a linear thermal expansion coefficient, then the following relation holds.

$$Tc=[1.5+3.25\lambda/(d \times h)] \times (1-\nu) \times \sigma_t / E \times \alpha$$

When the cover film is a silicon nitride, elements in the above equation are as follows.

$\lambda$=40 W/m·K
d=0.1×10$^{-3}$ m
h=100,000 W/m$^2$·K
$\nu$=0.29
$\sigma_t$=400 MPa
E=300×10$^3$ MPa
$\alpha$=3.2×10$^{-6}$/° C.

Thus, if we take [1.5+3.25$\lambda$/(d×h)] to be X, we get $$X = [1.5 + 3.25 \times 40 / 0.1 \times 10^{-3} \times 100,000]$$
$$= 1.5 + 3.25 \times 4 = 14.5$$
$$Tc = X(1-0.29) \times 400 / (300 \times 10^3 \times 3.2 \times 10^{-6})$$
$$= 14.5 \times 0.71 \times 400 / 0.96$$
$$= 4290$$

Thus, this ceramic sheath type thermocouple with a silicon nitride cover film can withstand as high a temperature as 1500° C. while measuring the temperature of a molten iron.

Because the ceramic sheath type thermocouple has exposed from the protective tube the joint of the W—Re wires that constitutes the temperature measuring portion and because the surface of the exposed portion of the W—Re wires is deposited with a cover film of silicon nitride or silicon carbide, the heat capacity of the temperature measuring portion is minimized, which in turn causes the temperature measuring portion of the thermocouple to rise quickly to the temperature of an object being measured, improving the temperature measuring responsibility, allowing high-precision measurement of the temperature of an object such as molten iron in a short period of time.

The protective tube is covered with the cover film and fitted with the socket of silicon carbide fiber in the molten metal contact region and therefore has excellent heat resistance and oxidation resistance. Further, because silicon nitride and silicon carbide are not easily wetted by a molten iron, the molten metal does not adhere to the molten metal contact region of the thermocouple. Because of this, even when the thermocouple is used repetitively a number of times, it is possible to measure the temperature of an object being measured such as molten metal with high precision and quickly, prolonging the service life of the thermocouple.

The heat of the temperature measuring region of this ceramic sheath type thermocouple is insulated by the filler in the protective tube, making it hard for the heat to escape rearwardly through the protective tube. This, combined with the small heat capacity of the temperature measuring region, improves the temperature measuring responsibility of the thermocouple.

DETAILED DESCRIPTION OF THE EMBODIMENT

By referring to FIGS. 1 to 4, embodiments of the ceramic sheath type thermocouple according to this invention will be described.

Figure 1:
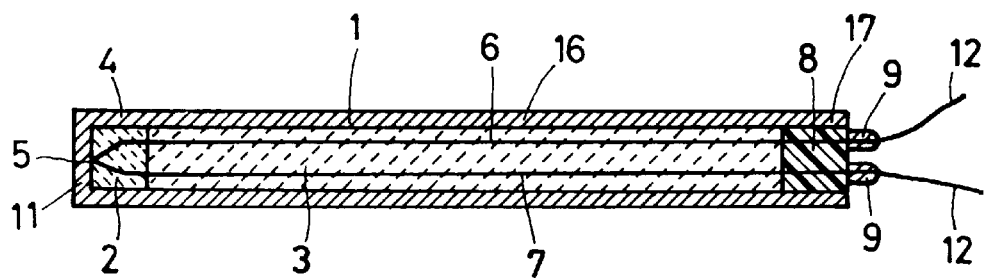
FIG. 1 is a cross section showing a ceramic sheath type thermocouple as a first embodiment of this invention.
Figure 2:
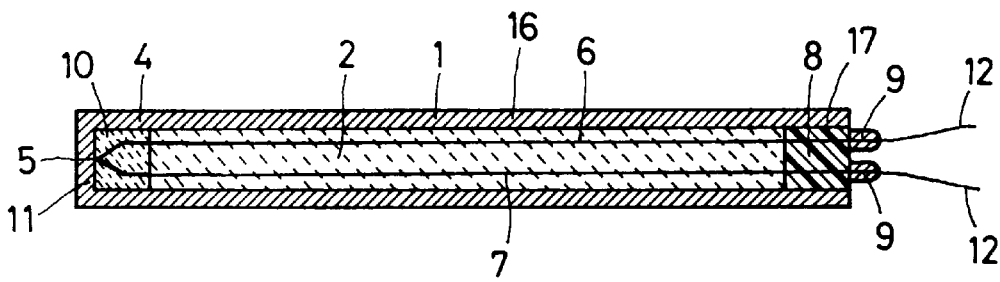
FIG. 2 is a cross section showing a ceramic sheath type thermocouple as a second embodiment of this invention.
Figure 3:
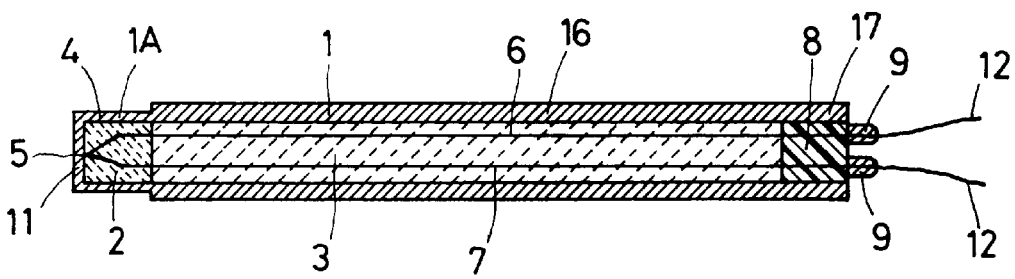
FIG. 3 is a cross section showing a ceramic sheath type thermocouple as a third embodiment of this invention.
Figure 4:
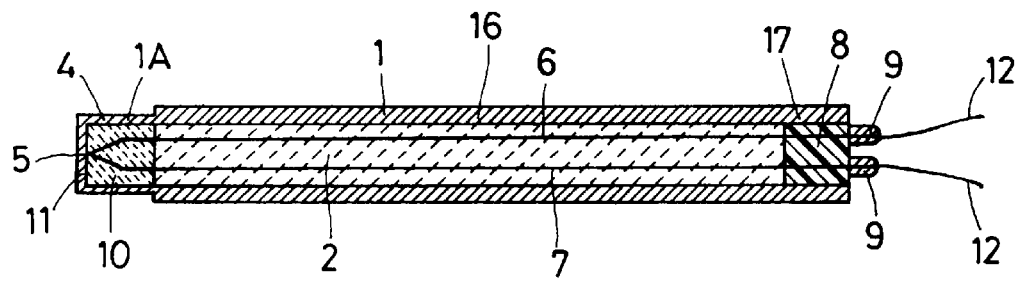
FIG. 4 is a cross section showing a ceramic sheath type thermocouple as a fourth embodiment of this invention.

As shown in FIGS. 1 to 4, the ceramic sheath type thermocouple of this invention is characterized by a material filled in a protective tube 1 and by a geometry of the protective tube 1. A material with a large thermal conductivity is filled in the interior of a front end portion 4 of a temperature measuring region of the protective tube 1; and a material with a small thermal conductivity is filled in the interior of a rear portion 16 other than the front end portion 4. Alternatively, as shown in FIGS. 3 and 4, the front end portion 4 of the protective tube 1 is reduced in outer diameter to reduce its heat capacity so that the temperature of the thermocouple can rise immediately in response to the temperature of an object being measured. To prevent W—Re wires 6, 7 contained in the protective tube 1 from being broken due to oxidation corrosion, inert gases such as Ar and $N_2$ are sealed in the protective tube 1 by a sealing member 8.

This ceramic sheath type thermocouple comprises: a protective tube 1 made of ceramics, such as silicon nitride ($Si_3N_4$), sialon and silicon carbide (SiC); W—Re wires 6, 7 having their joint in that front end portion 4 inside the protective tube 1 which forms a temperature measuring point 5; a filler made of ceramics with a large heat conductivity and filled in the front end portion 4 as the temperature measuring point of the protective tube 1 so as to enclose the W—Re wires 6, 7; and a filler made of ceramics with a smaller heat conductivity than that of the filler of the front end portion 4 and filled in the rear portion 16 of the protective tube 1 other than the front end portion 4.

In these embodiments, when, as shown in FIGS. 1 and 3, a filler 2 made of a composite ceramics having a main component of reaction-sintered $Si_3N_4$ ceramics is filled in the front end portion 4 of the protective tube 1, the rear portion 16 of the protective tube 1 is filled with a filler 3 made of ceramic fibers such as SiC whisker. When, as shown in FIGS. 2 and 4, the front end portion 4 of the protective tube 1 is filled with a filler 10 made of a composite ceramics having a main component of reaction-sintered AlN ceramics, the rear portion 16 of the protective tube 1 is filled with the filler 2 made of a composite ceramics having a main component of reaction-sintered $Si_3N_4$ ceramics.

The filler 2 is made of a composite ceramics formed by sintering slurry containing Ti, Si and $Si_3N_4$. When slurry is loaded into the protective tube 1 and reaction-sintered, it expands because it contains T1, causing the filler 2 to adhere to the inner wall surface of the protective tube 1, which in turn improves heat conduction from the protective tube 1 to the filler 2.

The filler 10 contains particles such as AlN with heat conductivity of 50 W/m·K or higher and is made, for example, of a composite ceramics formed by sintering slurry containing Ti, Si and AlN. The heat conductivity of the filler 10 may be set higher than that of the filler 2.

Figure 5:
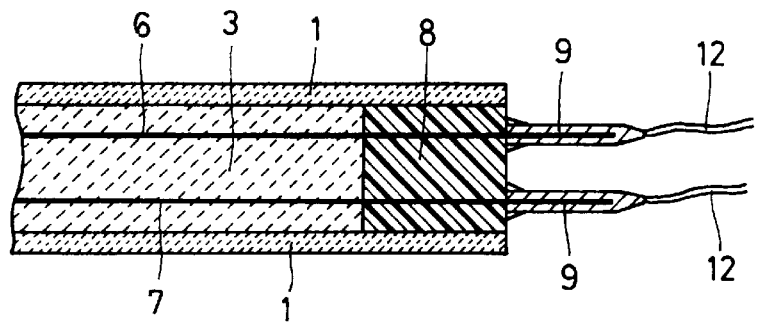
FIG. 5 is a partially enlarged cross section showing an end portion of the ceramic sheath type thermocouple.

The filler 3 is made of ceramic fibers (FIGS. 1 and 3) such as SiC whisker. The protective tube 1 is sealed with an inert gas such as $N_2$ and Ar by the sealing member 8 of, for instance, polyimide resin and lead glass that is hermetically fitted in an open end portion 17 of the protective tube 1, as shown in FIG. 5. When the filler 3 is made of ceramic fibers, an inert gas is introduced into the rear portion 16 of the protective tube 1 When the filler 3 is made of a reaction-sintered ceramics, the slurry filled into the protective tube 1 is reaction-sintered in the presence of $N_2$ atmosphere, sealing $N_2$ during the process.

The front end portion 4 of the protective tube 1, as shown in FIGS. 3 and 4, is made smaller in outer diameter than the rear portion 16 of the protective tube 1, with the inner diameters of these portions set equal, so that the front end portion 4 is formed thinner than other parts. With the thickness of the front end portion 4 of the protective tube 1 reduced, the heat capacity of the front end portion 4 as the temperature measuring point 5 is lowered. This in turn allows the front end portion 4 to quickly raise its temperature in response to the temperature of the temperature measuring region, further improving the temperature measuring responsiveness.

Embodiment 1

The first embodiment of the ceramic sheath type thermocouple is manufactured as shown in FIG. 1. The protective tube 1 is formed of sialon with dimensions, 5 mm in inner diameter, 8 mm in outer diameter and 300 mm in length. As to the geometry of the protective tube 1, the front end 11 of the front end portion 4 is hermetically closed while the rear end of the rear portion 16 is open. The W—Re wires 6, 7 comprise a 0.5-mm-diameter W—Re wire 6 made of W-5%Re(+) and a 0.5-mm-diameter W—Re wire 7 made of W-26%Re(−), serially connected together at one end. The joint portion of the connected wires is situated in a region of the temperature measuring point 5 of the protective tube 1 in such a way that it remains out of contact with the protective tube 1. Next, a slurry (to be transformed into the filler 2) containing a mixture of 40% Si powder by weight, 50% $Si_3N_4$ by weight and 10% Ti by weight is filled into the front end portion 4 of the protective tube 1 up to 15 mm from the front end 11. The rear portion 16 of the protective tube 1 is filled with the SiC whisker (to be transformed into the filler 3) so as to embed the W—Re wires 6, 7 in the fillers 2, 3 to fix them in the protective tube 1 Then, the loaded tube is reaction-sintered in the atmosphere of nitrogen at 0.93 MPa.

The filler 2, the slurry loaded in the front end portion 4 of the protective tube 1, is transformed into an $Si_3N_4$ reaction-sintered ceramics, a composite ceramics, which has a heat conductivity λ of 3.5 W/m·K. The filler 3 is SiC whiskers with a heat conductivity λ of 0.1 W/m·K. Next, the W—Re wires 6, 7 are connected with leads 12 individually, after which an $N_2$ gas (inert gas) is introduced into the protective tube 1, and the open end portion 17 of the protective tube 1 is sealed with the sealing member 8 of polyimide resin, which is formed with terminals 9. This is taken as an item 1 of the present invention.

Embodiment 2

The ceramic sheath type thermocouple of the second embodiment is fabricated as shown in FIG. 2. The second embodiment uses the protective tube 1 and W—Re wires 6, 7, both similar to those of the first embodiment. It loads a slurry (to be transformed into the filler 10) containing a mixture of 40% Si powder by weight, 50% AlN by weight and 10% Ti by weight into the front end portion 4 of the protective tube 1 up to 15 mm from the front end 11 and also a slurry (to be transformed into the filler 2) containing a mixture of 40% Si powder by weight, 50% $Si_3N_4$ by weight and 10% Ti by weight into the rear portion 16 of the protective tube 1. From this point afterward, the second embodiment is manufactured in a manner similar to the first embodiment.

The filler 10, the slurry loaded into the front end portion 4 of the protective tube 1, is transformed into an $Si_3N_4$ reaction-sintered ceramics, a composite ceramics, with a heat conductivity λ of 15 W/m·K. The improved heat conductivity is realized by addition of an additive AlN having a heat conductivity λ of 140 W/m·K or higher. The filler 2, the slurry loaded into the rear portion 16 of the protective tube 1, is transformed into an $Si_3N_4$ reaction-sintered ceramics, a composite ceramics, with a heat conductivity λ of 3.5 W/m·K. This product is taken as an item 2 of this invention.

Embodiment 3

The ceramic sheath type thermocouple of the third embodiment is manufactured as shown in FIG. 3. The third embodiment uses the W—Re wires 6, 7 and fillers 2, 3, both similar to those of the first embodiment. The front end portion 4 of the protective tube 1 extending rearwardly up to 15 mm from the front end is formed as a 6-mm-outer-diameter thin tube portion 1A of sialon with the same inner diameter and length as those the protective tube 1 of the first embodiment, i.e., 5 mm in inner diameter and 300 mm long. The third embodiment is thereafter manufactured in the same process as the first embodiment.

The third embodiment uses for the fillers 2 of the front end portion 4 of the protective tube 1 and for the filler 3 of the rear portion 16 the same materials as those used in the first embodiment. Hence, the only difference between the first and the third embodiment is the thickness of the front end portion 4 of the protective tube 1 This product is taken as an item 3 of this invention.

Embodiment 4

The ceramic sheath type thermocouple of the fourth embodiment is manufactured as shown in FIG. 4. The fourth embodiment uses the same protective tube 1 as that of the third embodiment, and the filler 10 in the front end portion 4 and the filler 2 in the rear portion 16 are formed in a manner similar to the second embodiment. In other manufacturing processes, the fourth embodiment takes the similar steps to those employed in the second embodiment. Because the filler 10 in the front end portion 4 of the protective tube 1 and the filler 2 in the rear portion 16 are made from the same materials as those used in the second embodiment, the fourth embodiment differs from the second embodiment only in the thickness of the front end portion 4 of the protective tube 1 This product is taken as an item 4 of this invention.

Figure 7:
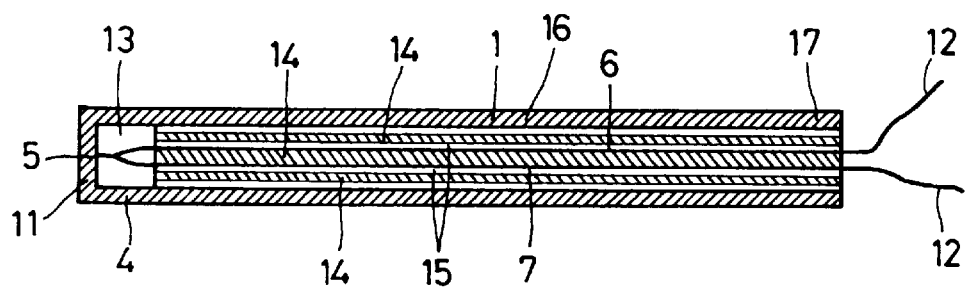
FIG. 7 is a cross section showing a first comparison example of the ceramic sheath type thermocouple.
Figure 8:
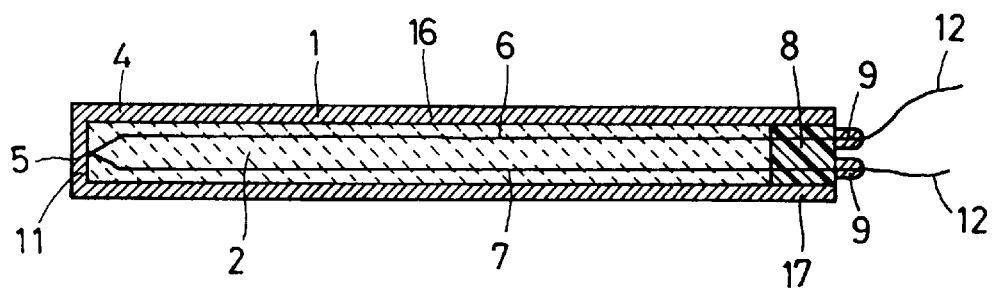
FIG. 8 is a cross section showing a second comparison example of the ceramic sheath type thermocouple.

To examine the responsivity of this ceramic sheath type thermocouple, two thermocouples of ceramic sheath type were fabricated for comparison, one shown in FIG. 7 as a comparison example 1 and one shown in FIG. 8 as a comparison example 2.

Comparison Example 1

The comparison example 1, as shown in FIG. 7, installs in the protective tube 1 of the first embodiment an insulating tube 14 of $Si_3N_4$ having two piercing holes 15 therethrough, with the W—Re wires 6, 7 used in the first embodiment passing through the piercing holes 15 of the insulating tube 14. In the front end portion 4 of the protective tube 1 is formed an air chamber 13, in which the ends of the W—Re wires 6, 7 are joined to form a temperature measuring point 5. The other ends of the W—Re wires 6, 7 are connected with leads 12.

Comparison Example 2

The comparison example 2, as shown in FIG. 8, has the W—Re wires 6, 7 of the first embodiment inserted in the protective tube 1 used in the first embodiment. Next, a slurry (to be transformed into the filler 2) containing a powdered mixture of 40% Si powder by weight, 50% $Si_3N_4$ by weight and 10% Ti by weight is filled into the protective tube 1 to contain the W—Re wires 6, 7 in the slurry to fix it in the protective tube 1 Thereafter the comparison example 2 is subjected to the processes similar to those of the first embodiment.

Figure 6:
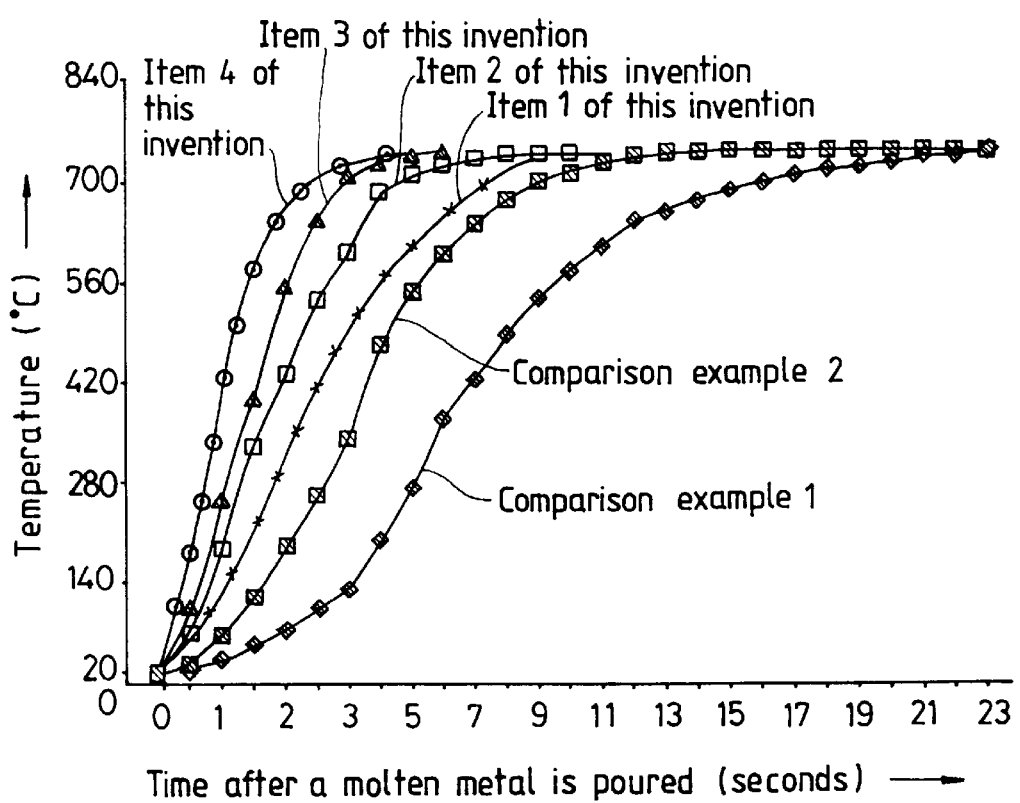
FIG. 6 is a graph showing responsibility of the ceramic sheath type thermocouple.

The ceramic sheath type thermocouples manufactured in the foregoing embodiments and comparison examples were immersed in molten aluminum at 730° C. to take temperature measurements over time through detecting changes in thermoelectromotive force of these ceramic sheath type thermocouples. The result of measurements is shown in a graph of FIG. 6. As can be seen from FIG. 6, the item 4 of this invention has the fastest responsiveness, followed by the item 3, followed by the item 2 and then by the item 1. The comparison example 2 has a responsiveness slower than the item 1, and the comparison example 1 has the worst responsiveness.

These facts have shown that the responsiveness of the ceramic sheath type thermocouple is improved by setting the heat conductivity of the material filled in the rear portion 16 of the protective tube 1 lower than the heat conductivity of the material filled in the front end portion 4 of the protective tube 1; by increasing the heat conductivity of the material filled in the front end portion 4 of the protective tube 1; and by reducing the thickness of the front end portion 4 of the protective tube 1 to reduce its heat capacity.

Next, by referring to FIGS. 9 to 12, the fifth embodiment of the ceramic sheath type thermocouple of this invention will be described.

This ceramic sheath type thermocouple is suited for measuring high temperatures and is characterized by a filler material filled into the protective tube 21 and the structure of a temperature measuring portion 22 at the front end of the protective tube 21. The temperature measuring portion 22 is projected from the front end portion 24 of the protective tube 21 to reduce its heat capacity so that the temperature of the temperature measuring portion 22 can quickly rise in response to the temperature of an object being measured. Further, to prevent breakage due to oxidation corrosion of the W—Re wires 26, 27 installed in the protective tube 21, a filler 23 of reaction-sintered ceramics is loaded in the protective tube 21, which is sealed with a sealing member 32 of glass.

This ceramic sheath type thermocouple comprises: a protective tube 21 made of ceramics selected from silicon nitride ($Si_3N_4$), sialon (Si—Al—O—N) and silicon carbide (SiC); a pair of W—Re wires 26, 27 of different compositions installed inside the protective tube 21; a joint portion 29 formed by joining the ends of the W—Re wires 26, 27 and exposed from the front end portion 24 of the protective tube 21; a cover film 28 covering the joint portion 29 exposed from the protective tube 21 and made of silicon carbide, silicon nitride or a combination of these; and a heat resisting filler 23 filled into the protective tube 21 and having a small dimensional change during sintering. The heat resisting filler 23 is made of a reaction-sintered ceramics containing Ti. The end of the protective tube 21 on the temperature measuring end side is attached with a socket 25 made of silicon carbide fiber. Further, the cover film 28 is formed by the CVD and also covers the entire surface of the protective tube 21 to improve the heat resistance of the thermocouple.

When a slurry containing Ti is filled into the protective tube 21 and reaction-sintered, a filler 23 expands because of Ti contained to adhere to the inner wall surface of the protective tube 21 without any clearance between the protective tube 21 and the filler 23. The filler 23 is made of ceramic fibers such as SiC whisker or an $Si_3N_4$ reaction-sintered ceramics. The interior of the protective tube 21 is sealed with an inert gas such as $N_2$ or Ar. A sealing member 32 of polyimide resin and lead glass is fitted in the open end of the protective tube 21 to seal the inert gas in the protective tube 21. When the filler 23 is made of a reaction-sintered ceramics, $N_2$ is naturally sealed during the course of reaction-sintering the slurry filled in the protective tube 21 in the presence of an $N_2$ gas.

Embodiment 5

Figure 9:
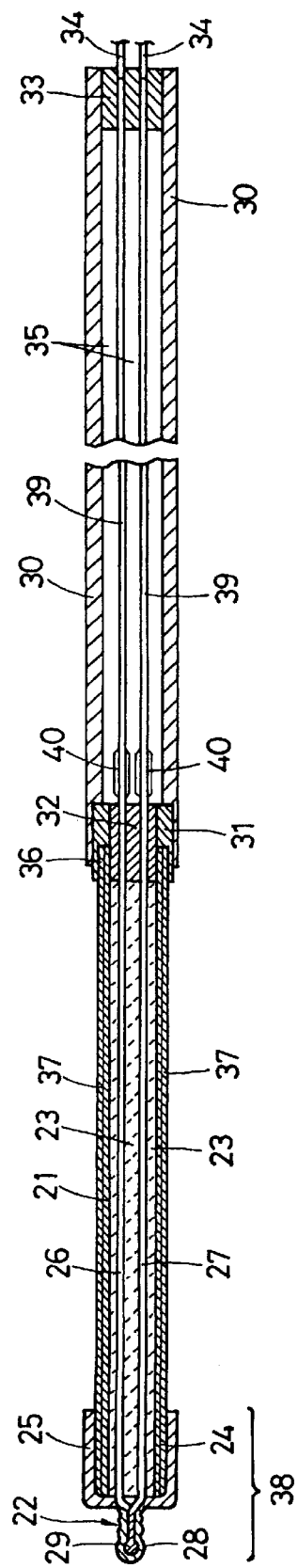
FIG. 9 is a cross section showing a ceramic sheath type thermocouple as a fifth embodiment of this invention.
Figure 10:
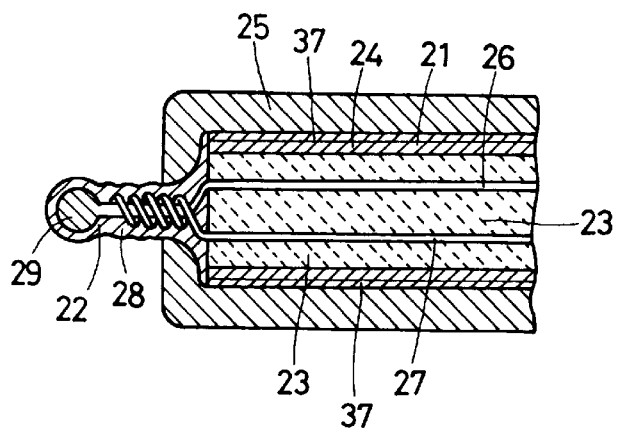
FIG. 10 is an enlarged cross section showing a front end portion of the ceramic sheath type thermocouple of FIG. 9.

The ceramics sheath type thermocouple of the fifth embodiment has the structure shown in FIG. 9. The W—Re wires 26, 27 comprise a W-5Re wire and a W-26Re wire having differing compositions and the same line diameter of 0.5 mm and length of 300 mm, with their ends joined to form a joint portion 29.

The protective tube 21 is made of silicon nitride and has an outer diameter of 8 mm. In the protective tube 21 are installed the W—Re wires 26, 27 with the joint portion 29 exposed from the end of the protective tube 21. Next, a material powder containing Ti and Si is filled into the space inside the protective tube 21 so as to enclose the wires 26, 27. This is reaction-sintered in the presence of nitrogen gas at 1400° C., and the reaction-sintered thermocouple is placed in a furnace at 1500° C., into which a source gas of silicon tetrachloride and ammonia and a carrier gas of hydrogen and nitrogen gases are introduced to cause a reaction whereby the entire surface of the protective tube 21 of the thermocouple including the front end portion as the temperature measuring portion is deposited with cover films 28, 37 of silicon nitride about 100 micron thick.

In another process similar to the above, a methane gas in stead of an ammonia gas is used as the source gas, and the reaction-sintered thermocouple is introduced into the furnace at 1500° C. to cause a reaction, thereby forming the cover films 28, 37 of silicon carbide about 100 micron thick over the entire surface of the protective tube 21 of the thermocouple including the front end portion as the temperature measuring portion.

Next, the open end of the protective tube 21 is sealed with a silicon glass 32, and the ends of the W—Re wires 26, 27 are connected with nickel leads 39 by silver solders 40. The front end portion 24 of the protective tube 21 situated in a molten metal contact region 38 is attached with a socket 25 made of woven silicon carbide fiber. To facilitate the work of measuring the temperature of a molten metal by the thermocouple, the other end of the protective tube 21 is connected, through a SUS connecting fitting 31 having threads 36, with a SUS pipe 30 that has a hollow portion 35 about 1.5 m long. The other end of pipe 30 is fitted with a terminal sealing member 33, from which terminals 34 of the leads 39 project.

A temperature measurement responsiveness test was made, in which the molten metal contact region 38 of the ceramic sheath type thermocouple (item 5 of this invention) manufactured as described above was injected into a molten iron at 1450° C.

Figure 11:
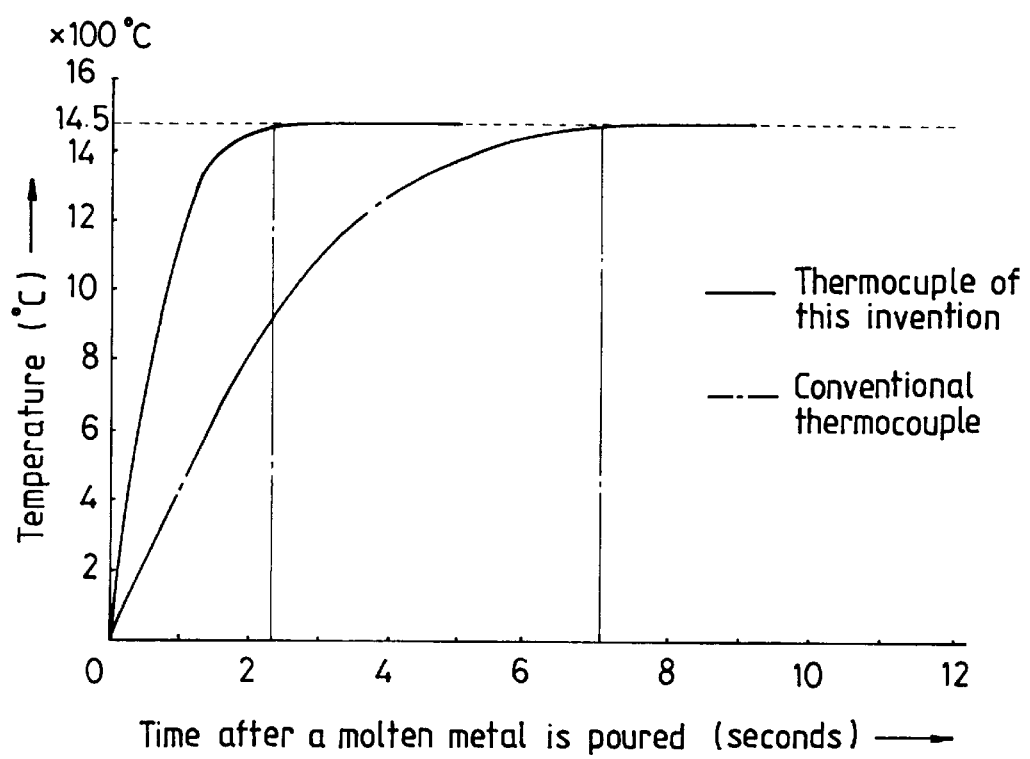
FIG. 11 is a graph showing a temperature increase over time in the ceramic sheath type thermocouple of FIG. 9 after the molten metal is poured.
Figure 12:
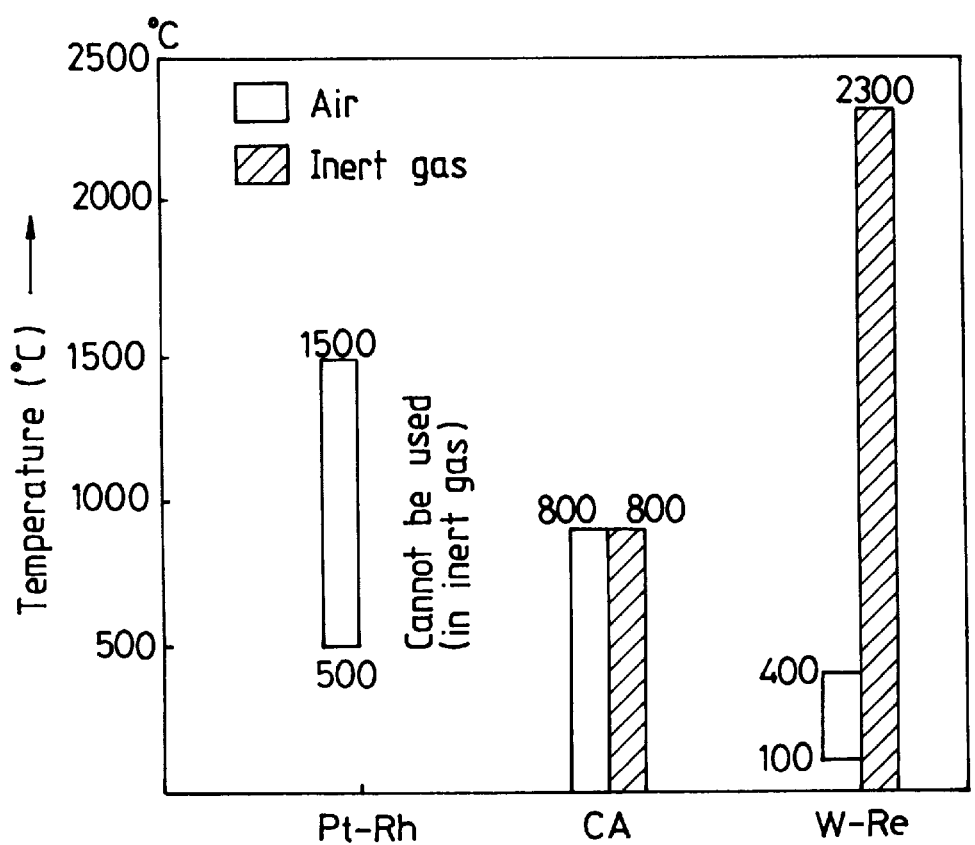
FIG. 12 is a graph showing service temperature ranges of thermocouples according to materials forming the thermocouples.

For comparison with the item 5 of this invention, a conventional thermocouple (existing one) was subjected to the same test. The test results of the item 5 of this invention and the conventional thermocouple are shown in FIG. 11 for comparison. As can be seen from FIG. 11, the item 5 of this invention was able to measure the temperature of 1450° C. of the molten iron in about two seconds, while the conventional thermocouple took about seven seconds. This means that the item 5 of this invention has an extremely fast temperature measuring responsiveness compared with the conventional product. The item 5 was subjected to more than 1500 measurements of the molten iron and no damages resulted. In the conventional thermocouple, on the other hand, the molten iron was found adhering to the temperature measuring portion after about two measurements, causing chemical changes to the temperature measuring portion, leading to damages and deteriorated measurement accuracy.

What is claimed is:

1. A ceramic sheath type thermocouple comprising:

a protective tube made of a ceramics selected from silicon nitride, SiAlON and silicon carbide and having an end face of a front end portion thereof closed, the front end portion constituting a temperature measuring portion;

a pair of W—Re wires of different compositions installed inside the protective tube and connected together in a region of the front end portion of the protective tube;

a first filler filled into the front end portion of the protective tube to enclose the W—Re wires, said first filler being made mainly of a reaction-sintered $Si_3N_4$ ceramic and particles selected from the group consisting of AlN, SiC, and $Si_3N_4$; and a second filler filled into the protective tube other than the front end portion, said second filler being made of a material having a heat conductivity smaller than that of the first filler.

2. A ceramic sheath type thermocouple according to claim 1, wherein the second filler contains a reaction-sintered ceramics.

3. A ceramic sheath type thermocouple according to claim 1, wherein an inert gas selected from the group consisting of N2 and Ar is introduced into the protective tube and an open end of the protective tube is sealed by a sealing member to seal the inert gas in the protective tube.

4. A ceramic sheath type thermocouple according to claim 1, wherein said particles contained in the first filler have a heat conductivity of at least 50 W/m·K.

5. A ceramic sheath type thermocouple according to claim 1, wherein the outer diameter of the front end portion of the protective tube is smaller than the outer diameter of the protective tube other than the front end portion, and the front end portion is thin.

* * * * *